Feb. 10, 1970  N. J. LIPSTEIN  3,494,705
HONEYCOMB PRESSURE REDUCING DEVICE
Filed Nov. 17, 1967  2 Sheets-Sheet 1

Inventor:
Norman J. Lipstein,
by Paul A. Frank
His Attorney.

Feb. 10, 1970   N. J. LIPSTEIN   3,494,705
HONEYCOMB PRESSURE REDUCING DEVICE
Filed Nov. 17, 1967   2 Sheets-Sheet 2

Inventor:
Norman J. Lipstein,
by Paul A. Frank
His Attorney.

United States Patent Office

3,494,705
Patented Feb. 10, 1970

3,494,705
HONEYCOMB PRESSURE REDUCING DEVICE
Norman J. Lipstein, Schenectady, N.Y., assignor to General Electric Company, a corporation of New York
Filed Nov. 17, 1967, Ser. No. 684,057
Int. Cl. F01d 1/00, 5/14, 7/00
U.S. Cl. 415—180                    1 Claim

ABSTRACT OF THE DISCLOSURE

A stationary baffle having a honeycomb structure for reducing the radial pressure gradient between a rotating member and the baffle and preventing radial inflow of the surrounding atmosphere.

---

This invention generally relates to the field of rotating machinery and, particularly, the field of stationary baffles for rotating members.

In high speed rotating machinery a substantial radial pressure gradient is built up between rotating members and adjacent stationary members. This pressure gradient has a number of detrimental effects such as producing unequal stresses which act on the rotating member producing premature fatigue and possible instabiliity of the rotating member, loss of bearing oil by the suction produced by the pressure gradient, increased contamination of bearings, and possible increase in temperature of the rotating member by the pumping of hot air surrounding the rotating member into the space between the rotating member and the stationary member.

Such effects decrease the life of the rotating member, necessitate the use of heavier and/or more costly materials, may reduce efficiency of the overall mechanism, or generally necessitate disadvantageous design limitations.

In the past the only way to reduce the radial pressure distribution would be to substantially increase the distance between the rotating member and the stationary member, thereby resulting in increased size and weight of the overall structure.

Accordingly, it is an object of the subject invention to provide a device for reducing the radial pressure distribution between a rotating member and a stationary member.

A further object is to provide such a device wherein radial inflow of the surrounding atmosphere into the area between the rotating member and the stationary member is substantially reduced or prevented.

The subject matter which I regard as my invention is particularly pointed out and distinctly claimed in the concluding portion of this specification. My invention, however, together with further objects and advantages thereof, may best be understood by reference to the following description taken in connection with the accompanying drawings in which:

Figure 1:
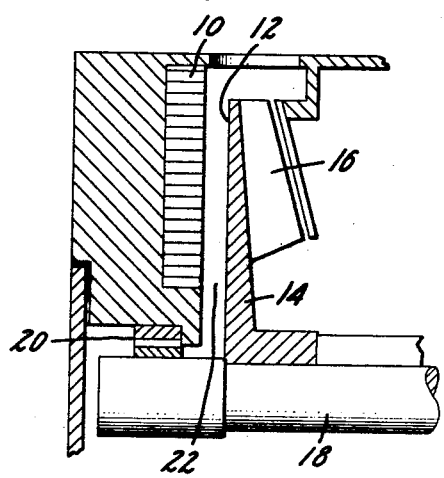
FIGURE 1 is a side sectional view of a portion of a centrifugal compressor embodying the subject invention.

As shown in FIGURE 1, the subject invention may consist of a honeycomb structured baffle 10 adjacent an end face 12 of a rotating member 14. The rotating member 14 may, for example, be a compressor wheel for a centrifugal compressor having blades 16 attached thereto, as is specifically shown in FIGURE 1. The rotating member 14 is rigidly connected to a driven shaft 18 which is journaled by means of bearings 20. A passage or interspace 22 is located between end face 12 and baffle 10. In this embodiment, no fluid is specifically pumped through interspace 22.

Figure 2:
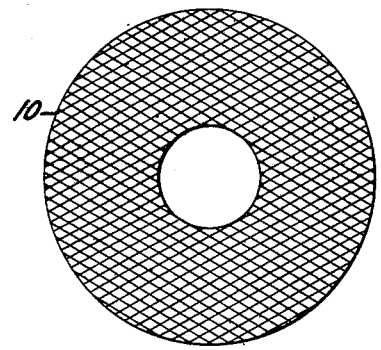
FIGURE 2 is a front view of an embodiment of a honeycomb baffle in accordance with the subject invention.

In FIGURE 2, a front view of a honeycomb baffle 10 is shown. The specific configuration of the holes in the honeycomb structure is not critical. For example, they may be diamond-shaped, as shown in FIGURE 2, or hexagonally-shaped.

In operation, the rotating member 14 is rotatably driven via the shaft 18. In practice, there will be a pressure differential between the area adjacent the outer tip of the rotating member and the area adjacent the radially-inward portion of the rotating member 14. For purposes of illustration, and since this is the condition most prevalent in actual conditions, the pressure at the outer tip will be considered greater than the pressure at the radially inward portion of the rotating member 14. The effect of this pressure difference is a tendency for fluid to flow radially inward through the interspace 22. However, it should be understood that the advantages occasioned by the subject invention are not affected by whether the pressure difference is positive or negative.

Due to rotation of member 14, fluid adjacent rotating member 14 will be acted upon by centrifugal force. This centrifugal force is proportional to the radial distance at which it acts and hence, the effective centrifugal force acting on the fluid will increase with radial distance up to the outermost edge of the rotating member.

Figure 4:
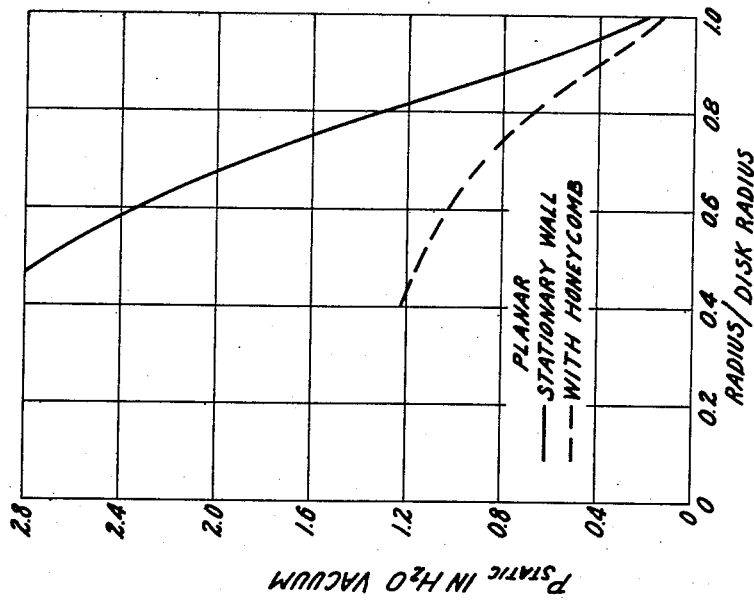
FIGURE 4 is a graph of the radial pressure distribution between a stationary member and a rotating member for both a planar and a honeycomb stationary member.

The advantageous effects of the use of a honeycomb baffle can best be seen by reference to the graph shown in FIGURE 4. This graph is a plot of static pressure (inches of water vacuum) versus radial distance (in the dimensionless units of radius/radius of rotating member) at a fixed axial distance from the rotating member, considering the pressure at the outer edge of the rotating member to be atmospheric and the pressure at the radially-inwardmost portion to be subatmospheric. Also, there is a constant spacing between the stationary wall and the rotating member, constant rotational velocity of the rotating member, and zero induced flow through the interspace.

The solid line shows the pressure gradient when a planar stationary wall is used; and the dotted line shows the pressure gradient when a honeycomb baffle in accordance with the subject invention is positioned in place of the planar stationary wall. The increase in slope of each of the curves with increased radial distance is due to the above-mentioned effect of the centrifugal force.

As can readily be seen, the pressure difference between any two radial distances is much less when the honeycomb structure is used than when a planar stationary wall is used. In fact, at a position 0.4 of the radial extent of the rotating member, the vacuum gauge pressure of the planar stationary wall is approximately two and one-half times as great as that for the honeycomb baffle.

The differences in radial pressure subject the rotating members to severe vibrational stresses which promote fatigue and may lead to acoustic oscillations of the rotating member. The pressure gradient may also cause a radial inflow of gases from the area adjacent the outer edge of the rotating member into the interspace thereby wasting some of the energy from this fluid as well as, in the case of turbine structure, increasing the temperature of the rotating member. Additionally, the pressure gradient may cause lubricating oil which is pumped to the shaft bearing to be sucked therefrom.

It is, therefore, obvious that the use of a honeycomb baffle to substantially decrease the radial pressure gradient consequently serves to substantially lessen the disadvantageous effects listed above.

In addition to reduced radial pressure gradient, the use of a honeycomb baffle substantially reduces the flow pumping capacity of a given disk and interspace. This characteristic is of considerable benefit in minimizing the sealing of a disk interspace either to inflow from the periphery or inner diameter.

Figure 3:
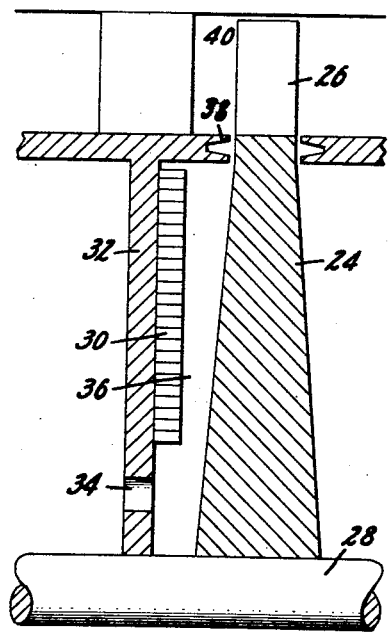
FIGURE 3 is a side sectional view of a portion of an axial flow turbine having interspace cooling which embodies the subject invention.

In FIGURE 3, a turbine configuration with forced air coolant is shown which uses the honeycomb baffle of the subject invention. The structure is comprised of a turbine wheel 24 having a plurality of turbine blades 26 at the outer end and which is attached to a shaft 28 at its inner end. Mounted adjacent turbine wheel 24 is a substantially annular-shaped honeycomb baffle 30 which is attached to a support structure 32. At the radially inward portion of the support structure 32 are apertures 34 which connect the interspace 36 between the baffle 30 and the rotating member 24 to a supply of cooling air. A seal 38 is provided adjacent the outer tip of the turbine wheel 24 to partially seal the hot gas stream 40 from the interspace 36.

In operation, the hot gas stream impinges upon turbine blades 26 causing rotation of turbine wheel 24 which thereby rotates shaft 28. At the same time, a cooling fluid, such as compressor discharge air, is pumped through apertures 34 into interspace 36 to cool turbine wheel 24 and prevent radial inflow of hot gases into the interspace 36.

Cooling is of particular interest regarding rotating turbine wheels in gas turbine engines which are subject to high temperature gases coming from the combustion chamber. A large radial pressure gradient and large disk pumping capacity have deleterious effects on turbine wheel cooling as they both increase the difficulty of sealing the interspace from hot gas inflow. The coolant which must be supplied to the disk interspace is often several times that needed to extract the sum of heat conducted from the turbine blading and dissipated by the disk in order to prevent hot gas inflow. As previously described the honeycomb structure minimizes the radial inflow effects so that less coolant flow is required. This significantly increases the efficiency of the entire gas turbine.

Figure 5:
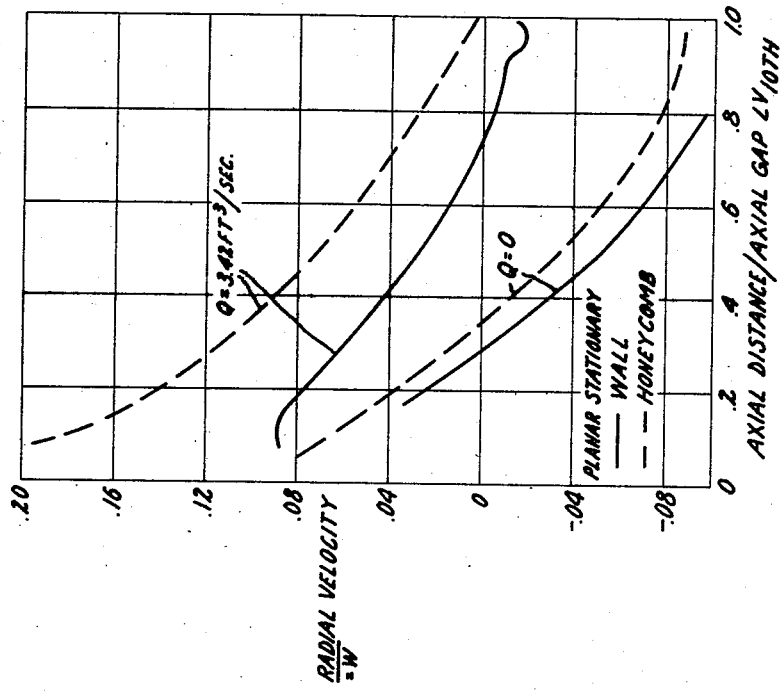
FIGURE 5 is a graph of the radial velocity distribution along the axial distance between a stationary member and a rotating member at various applied thru-flow rates for both a planar and a honeycomb stationary member.

This effect can most easily be seen by reference to the graph shown in FIGURE 5. This graph is a plot of the radial velocity (as a dimensionless quantity) of the interspace fluid along the axial distance (expressed as a dimensionless quantity) between the end face of the rotating member and the adjacent wall for different cooling flow rates (Q) and different wall structures. The curves, which represent measurements taken with the same interspace gap at one radial distance, show that with the plain wall structure, even at a relatively high flow rate of 3.42 cubic feet per second, a radial inflow of hot gases occurs for approximately one-quarter of the gap distance closest to the turbine wheel. However, with the honeycomb baffle, no radial inflow occurs through the entire axial gap for the same flow rate.

Of course, the use of a honeycomb structure allows the stationary member to be placed close to the rotating member without any significant deleterious effects, as in the past, thereby allowing a more compact structure of the entire rotating machinery.

Although the use of a honeycomb structure increases disk losses due to friction, these losses are quite small compared to the advantageous effects of the honeycomb structure.

Thus, the subject invention provides a stationary baffle structure which increases the overall efficiency of rotating machinery, allows for a more compact structure, and substantialy reduces the stresses on rotating members.

It is fully intended that many modifications may be made to the disclosed baffle structure which do not depart from the scope of the subject invention.

What I claim as new and desire to secure by Letters Patent of the United States is:

1. In a gas turbine including at least one rotating bladed wheel having an end face with a substantially imperforate portion and an adjacent stationary member associated therewith, the improvement comprising
at least one radially extended honeycomb structure attached to said stationary member adjacent the end face of said wheel and space therefrom to form a passageway therewith, and
means for producing a radial outflow of cooling fluid in the passageway between the turbine wheel end face and said one honeycomb structure.

References Cited

UNITED STATES PATENTS 3,083,975  4/1963  Kelly.

FOREIGN PATENTS 793,886  4/1958  Great Britain.

EVERETTE A. POWELL, Jr., Primary Examiner